(12) United States Patent
Thomas

(10) Patent No.: US 6,327,389 B1
(45) Date of Patent: Dec. 4, 2001

(54) IMAGE PIXEL BRIDGE

(75) Inventor: Brent D. Thomas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/120,496

(22) Filed: Jul. 21, 1998

(51) Int. Cl.[7] .................................................. G06K 9/94
(52) U.S. Cl. ................................. 382/223; 257/291
(58) Field of Search ................................. 382/223, 221, 382/222, 220, 230; 257/291, 443, 448, 290; 250/578, 211, 208

(56) References Cited

U.S. PATENT DOCUMENTS

| | | | | |
|---|---|---|---|---|
| 4,363,963 | * | 12/1982 | Ando .................................... | 250/211 |
| 4,518,863 | * | 5/1985 | Fukuoka et al. ...................... | 250/578 |
| 5,337,250 | * | 8/1994 | Sidiski ................................. | 364/481 |
| 5,604,364 | * | 2/1997 | Ohmi et al. .......................... | 257/291 |
| 5,615,143 | * | 3/1997 | MacDonald et al. ................ | 365/112 |

\* cited by examiner

*Primary Examiner*—Andrew W. Johns
*Assistant Examiner*—Seyed Azarian
(74) *Attorney, Agent, or Firm*—Blakely, Sokoloff, Taylor & Zafman LLP

(57) ABSTRACT

A photosensing circuit, system and method. The photosensing circuit includes a photodetector and a network coupled to the photodetector. The network includes a plurality of elements and at least a first and second output terminals, the elements of the network being selected such that a difference of signals flowing out of the first and second output terminals is directly proportional to an amount of light impinging on the photodetector and is substantially free of electrical noise.

17 Claims, 3 Drawing Sheets

IMAGE PIXEL BRIDGE

BACKGROUND OF THE INVENTION

1. Field of the Invention

This invention relates generally to imaging detectors, and more particularly, to a photosensing circuit which provides a differential output substantially free of electrical noise.

2. Description of Related Art

Imaging detectors are usually formed by arranging single photodetectors in linear one-dimensional or two-dimensional arrays. The outputs of the photodetectors are connected in parallel to the processing circuits. Since the output of each of the photodetectors may travel a considerable distance to the processing circuits, electrical noise may be induced from current circulating in the power rails and neighboring circuits, and may be picked up by the output lead and added to the photodetector output signal. Electrical noise may also originate from injected noise in the power sources which is directly delivered to the photodetectors via the power rails. Electrical noise may also be inherent, caused by fabrication defects due to tightly packed clusters of circuits. Electrical noise in a photodetector, whether induced, injected or inherent, is common-mode in nature. This electrical noise may be substantially greater than the photodetector output signal, and is one of the most undesirable characteristics of the currently available complementary metal-oxide silicon (CMOS) photodetectors. Presently, this electrical noise is estimated and compensated for in the processing circuits.

Thus, currently, there is a need for a photosensing circuit which has an inherent property of rejecting induced, injected or inherent electrical noise from power rails and neighboring circuits. Such circuit would eliminate the need to compensate for the induced, injected and inherent electrical noise in the processing circuits. The output of such a circuit would accurately represent the amount of light impinging on a photodetector and could be directly processed.

SUMMARY OF THE INVENTION

A photosensing circuit, system and method are disclosed. The photosensing circuit comprises a photodetector and a network coupled to the photodetector. The network comprises a plurality of elements and at least first and second output terminals, the elements of the network being selected such that a difference of signals flowing out of the first and second output terminals is directly proportional to an amount of light impinging on the photodetector, and substantially free of electrical noise.

BRIEF DESCRIPTION OF THE DRAWINGS

The features and advantages of the present invention will become apparent from the following detailed description of the present invention in which.

DESCRIPTION OF THE PRESENT INVENTION

The present invention is a photosensing circuit and system, and a method for eliminating noise coupled into a photodetector from current circulating in power rails. The photosensing circuit comprises a photodetector and a network coupled to the photodetector. The network comprises a plurality of elements and at least first and second output terminals, the elements of the network being selected such that a voltage developed across the first and second output terminals is directly proportional to an amount of light impinging on the photodetector.

Figure 1:
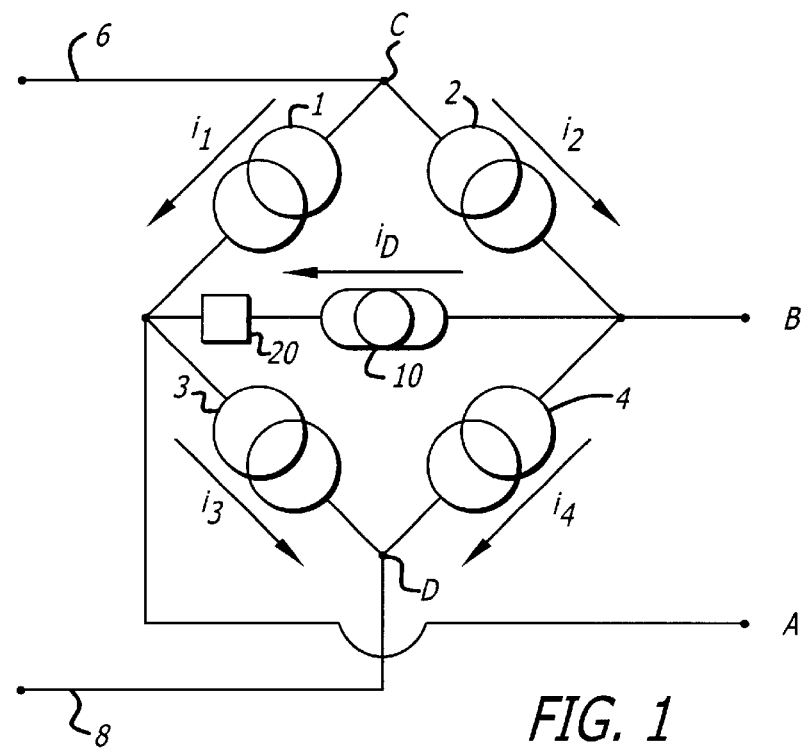
FIG. 1 is a diagram illustrating the first embodiment of the disclosed photosensing circuit.

FIG. 1 illustrates the first embodiment of the photosensing circuit. Referring to FIG. 1, the photosensing circuit 30 comprises a photodetector 10 which is coupled to a bridge network formed by the current sources 1, 2, 3, and 4. The outputs of the circuit can be the voltage VBA and/or the currents $i_B$, $i_A$ flowing out the output terminals B and A, respectively. The current sources are matched such that the voltage $V_{BA}$ developed across the output terminals B and A and the difference $i_B-i_A$ of the currents flowing out of the output terminals B and A are directly proportional, each with a different scale factor, to the amount of light impinging on the photodetector 10.

The photodetector 10 is preferably a reverse-biased photodiode operating in the photo-conductive mode. The photodiode 10 produces a current $i_D$ in response to an amount of light impinging on it. The current $i_D$ is directly proportional to the amount of impinging light, and is relatively small, in the order of about ten picoamperes. The bridge network allows this current $i_D$ to be measured without the distortion caused by electrical noise. Electrical noise may be induced from current circulating in the power rails and neighboring circuits, and may be picked up by the output leads and added to the photodetector output signal. Electrical noise may also originate from injected noise in the power sources which is directly delivered to the photodetector 10 via the power rails 6 and 8. Electrical noise may also be inherent, caused by fabrication defects due to tightly packed clusters of circuits. Electrical noise, whether induced, injected or inherent, is common-mode in nature and can be higher than the current $i_D$ by orders of magnitude. With the bridge network, the common-mode electrical noise is eliminated due to the fact that the difference $i_B-i_A$ of the output currents and the circuit output voltage $V_{BA}$ are differential in nature.

In FIG. 1, $i_B$ and $i_A$ denote the currents flowing out of network terminals B and A respectively, and $i_D$ denotes the current flowing through the photodiode 10 from network terminal B to network terminal A. Using Kirchhoff's current law, the currents $i_B$ and $i_A$, in the absence of electrical noise, can be expressed as:

$$i_B = i_2 - i_4 - i_D \quad (1)$$

$$i_A = i_1 - i_3 + i_D \quad (2)$$

where $i_1$, $i_2$, $i_3$ and $i_4$ are the currents flowing through the current sources 1, 2, 3, 4, respectively. In the presence of electrical noise, there are additional current noises $i_{NA}$ and $i_{NB}$ added to $i_A$ and $i_B$, respectively:

$$i_B = i_2 - i_4 - i_D + i_{NB} \quad (3)$$

$$i_A = i_1 - i_3 + i_D + i_{NA} \quad (4)$$

Since the electrical noise, as discussed above, is common-mode in nature, $i_{NA}$ and $i_{NB}$ are practically equal to each other. The current noises, $i_{NA}$ and $i_{NB}$, can be substantially greater than the photodiode current $i_D$. However, since $i_{NA}$ and $i_{NB}$ are equal, they are eliminated in the difference $i_B-i_A$.

Figure 2:
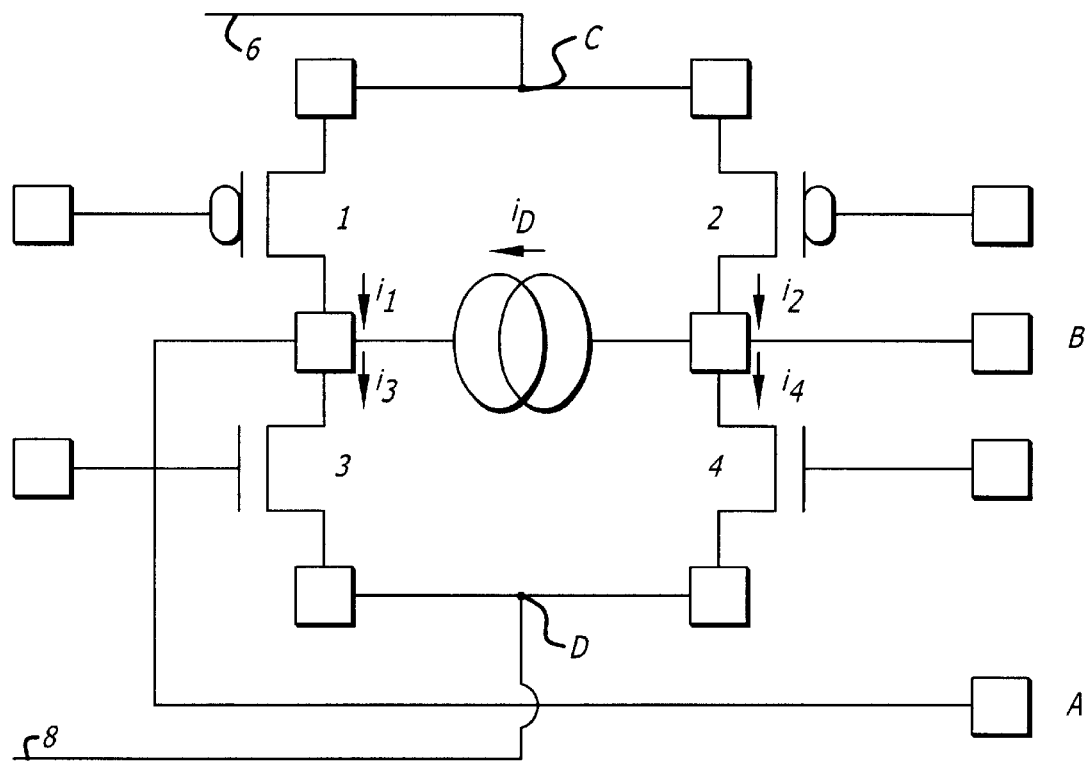
FIG. 2 is a diagram illustrating an implementation of the first embodiment of the disclosed photosensing circuit.

FIG. 2 depicts current sources 1, 2, 3, 4 as transistors that can be matched to produce a matched bridge network, such that either one of the two following sets of relations is obtained:

$$\{i_1=i_3 \text{ and } i_2=i_4\} \tag{5}$$

or $$\{i_1=i_2 \text{ and } i_3=i_4\}. \tag{6}$$

This matching of the current sources 1, 2, 3, 4 in turn provides:

$$i_B-i_A=-2i_D. \tag{7}$$

Equation (7) shows that the differential output $i_B-i_A$ is directly proportional to the current $i_D$ with a scale factor of −2. Since this gain is close to the photosite, less gain will be required further down the signal path for processing. Equation (7) implies that, for a matched bridge network, the following relations are true:

$$i_D<0 \Leftrightarrow i_B-i_A>0 \text{ and } V_{BA}>0 \tag{8}$$

$$i_D=0 \Leftrightarrow i_B-i_A=0 \text{ and } V_{BA}=0 \tag{9}$$

$$i_D>0 \Leftrightarrow i_B-i_A<0 \text{ and } V_{BA}<0 \tag{10}$$

For the case where the voltage $V_{BA}$ is used as the output of the circuit, the current sources 3 and 4, which are acting as current sinks, are controlled to yield the desired level of direct current (DC) reverse-biased voltage across the photodiode 10. This control can be attained via the DC bias of the respective gate-source and transistor scaling of the transistor components of the current sources 3 and 4.

Figure 3:
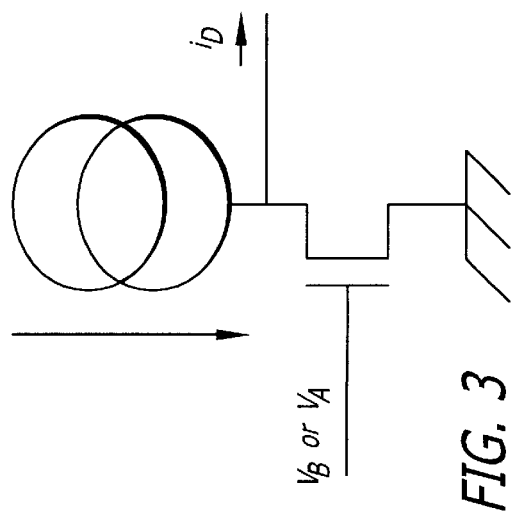
FIG. 3 is a diagram illustrating an interface circuit.

There are many ways to interface the disclosed photosensing circuit 30 with a processing circuitry which requires high level currents as inputs. For example, as shown in FIG. 3, each of the voltages $V_B$ and $V_A$ at terminals A and B can be fed to a respective voltage-to-current amplifier circuit. The output current $i_o$ can then be fed to a processing circuit.

As indicated by Equations (1), (2) and (6) above and illustrated in FIGS. 1 and 2, the current sources 1, 2, 3, 4 can also be used to provide another way of controlling the levels of currents $i_B$ and $i_A$. Specifically, by adjusting the level $i_2-i_4$, which is equal to $i_1-i_3$, the levels of $i_B$ and $i_A$ can be controlled.

Figure 4:
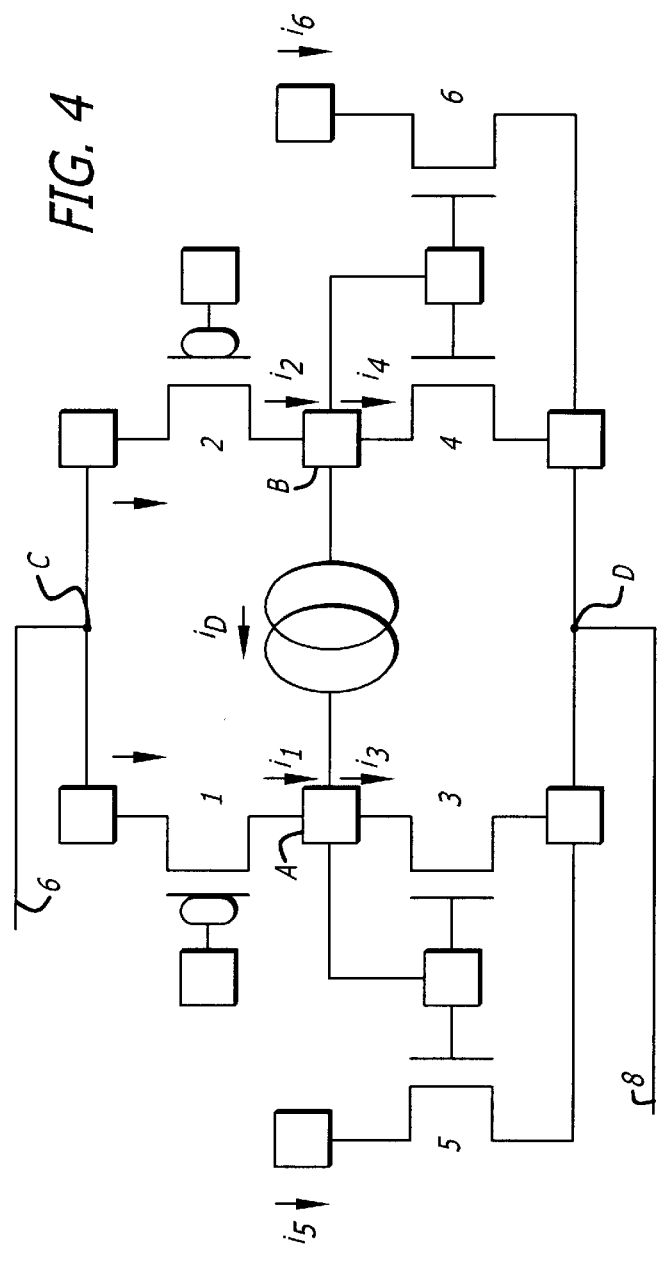
FIG. 4 is a diagram illustrating another implementation of the first embodiment of the disclosed photosensing circuit.

FIG. 4 illustrates a second embodiment of the photosensing circuit 30. In this embodiment, the current sources 3 and 4 are dependent current sources, controlled by the currents $i_1$ and $i_2$ of the current sources 1 and 2, respectively, and are expressed as:

$$i_3=i_1+i_D \tag{11}$$

$$i_4=i_2-i_D \tag{12}$$

In FIG. 4, dependent current sources 5 and 6 are used to provide access to the currents $i_3$ and $i_4$ flowing through dependent current sources 3 and 4. The dependent sources 5 and 6 are connected to the current sources 3 and 4, respectively, in a current-mirror configuration. This configuration allows the currents $i_3$ and $i_4$ to be reflected as currents $i_5$ and $i_6$. For FIG. 4, the following equation is true:

$$i_6-i_5=i_4-i_3=-2i_D. \tag{13}$$

Since the difference $i_6-i_5$ is directly proportional to the current $i_D$ with a scale factor of −2, the currents $i_5$ and $i_6$ can be used as the outputs of the photosensing circuit 30.

Figure 5:
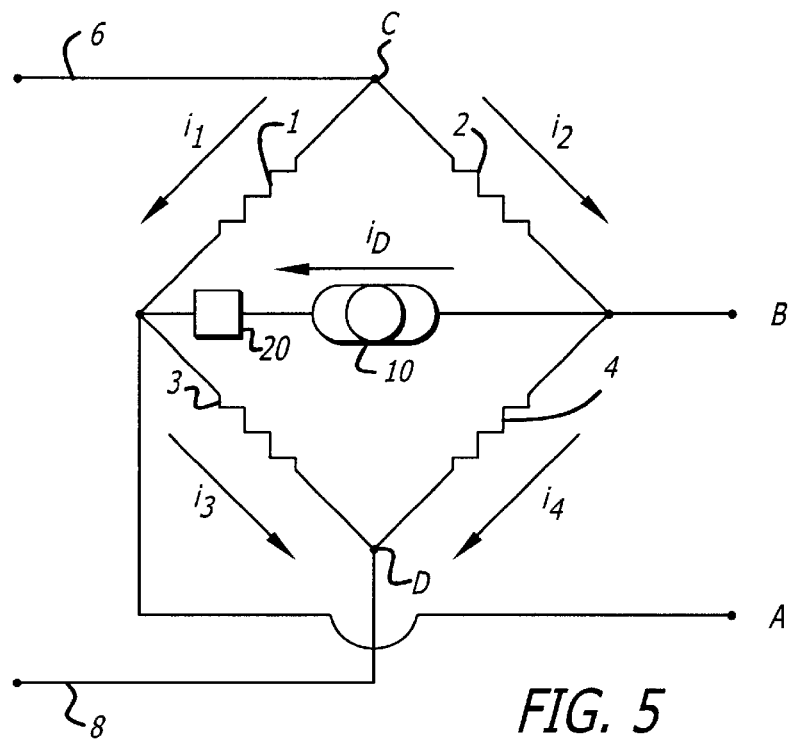
FIG. 5 is a diagram illustrating the second embodiment of the disclosed photosensing circuit.

FIG. 5 illustrates a third embodiment of the photosensing circuit 30. In this simplest form of the disclosed photosensing circuit, the photodetector 10 is coupled to a resistive bridge network comprising four resistors 1, 2, 3, 4. For this circuit, in the absence of electrical noise, Equations (1) and (2) still hold true. In the presence of electrical noise, Equations (3) and (4) still hold true. The resistors 1, 2, 3, 4 can be matched such that relation (6) is true. This matching of the resistors 1, 2, 3, 4 requires that:

$$R_2R_4/(R_2+R_4)=R_1R_3/(R_1+R_3) \tag{14}$$

where $R_1$, $R_2$, $R_3$, $R_4$ are the resistances of the resistors 1, 2, 3, 4, respectively. This matching in turn provides Equation (7), which is $i_B-i_A=-2i_D$.

In order to be energy efficient and cost effective, the third embodiment of the disclosed photosensing circuit requires that the resistors 1, 2, 3, 4 be implemented with small-sized high-valued resistors. This implementation is not easily achieved with the capabilities of current complementary metal-oxide silicon (CMOS) fabrication processes. A technique for achieving small-sized high-valued resistors is to utilize switched-capacitors which can simulate high-valued resistors with small-valued capacitors. Since switched capacitors are charge transfer devices, if they are used to simulate resistors, they must be connected to high impedance points. This technique can be used to implement the structure of FIG. 5. In such case, the nodes B and A would have to be correspondingly high-impedance nodes. This means that $i_A$ and $i_B$ are practically equal to zero. For the third embodiment, the following equations are true:

$$i_B=i_A=0 \tag{15}$$

$$V_{BA}=V_B-V_A=-i_D[R_2R_4/(R_2+R_4)+R_1R_3/(R_1+R_3)] \tag{16}$$

$$V_{BA}=-2i_D[R_2R_4/(R_2+R_4)] \tag{17}$$

Equation (17) shows that, for the third embodiment, the output-to-input gain factor is $-2[R_2R_4/(R_2+R_4)]$. Since this gain is close to the photosite, less gain will be required further down the signal path for processing.

Equation (17) also implies that, for the third embodiment, the following relations are true:

$$i_D<0 \Leftrightarrow V_{BA}>0 \tag{18}$$

$$i_D=0 \Leftrightarrow V_{BA}=0 \tag{19}$$

$$i_D>0 \Leftrightarrow V_{BA}<0 \tag{20}$$

In each of the embodiments, the photodiode 10 is initially reverse-biased. However, during the normal operation of the photosensing circuit 30, the voltage $V_{BA}$ will tend to forward-bias the photodiode 10. There are two ways of impeding this forward-biasing, as described below.

The first method of impeding the forward-biasing of the photodiode 10 is to place an element 20 in series with the photodiode 10 which absorbs some of the voltage $V_{BA}$. This element can be a resistive element such as a switch. This causes the voltage drop across the photodiode 10 to be smaller than the voltage $V_{BA}$.

The second method of impeding the forward-biasing of the photodiode 10 is to start with an unbalanced bridge network. In the first and second embodiments, this can be accomplished by using different transistor sizes, which in turn yield different current sources, on each side of the bridge network. In the third embodiment, this can be accomplished by using different resistive values on each side of the bridge network. The noise introduced by the bridge imbalance is systematic and measurable, and therefore can be electronically compensated at the processing circuit. Currently, in semiconductor processes, the ratios of transistor size factors, resistors and capacitors are controllable parameters.

An electronic shutter can also be formed by placing a metal-oxide silicon (MOS) switch 20 in series with the photodiode 10, or alternately, in the subsequent processing circuit. Such a shutter allows control of the operation of the photodiode 10. When the shutter 20 is closed, the photodiode 10 is responsive to impinging light, and the current $i_D$ will be detected. When the shutter 20 is open, the photodiode 10 is disconnected from one of the terminals A and B, and no current $i_D$ will be detected. In order to maintain the symmetry of the photosensing circuit 30, two switches can be used, one on each side of the photodiode 10. A common control signal can be routed to the two switches to operate them simultaneously.

In addition to eliminating induced, injected and inherent electrical noise, the disclosed photosensing circuit 30 also enhances the sensitivity of the photodiode 10. This enhanced sensitivity is linear over a large input light range due to the presence of the built-in reverse-biased voltage $V_{BA}$. The photosensing circuit as disclosed is small in size and can be implemented using complementary metal-oxide silicon (CMOS) fabrication technology. Also, by controlling the current sources 3 and 4 in the first embodiment, it is possible to electronically compensate for fixed pattern irregularities in images.

Figure 6:
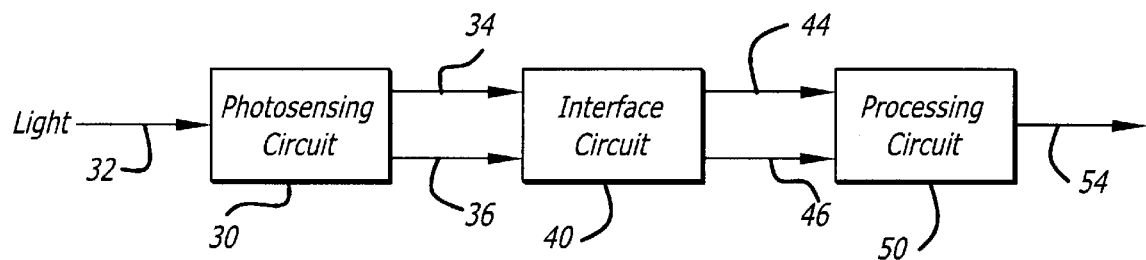
FIG. 6 is a block diagram of the disclosed photosensing system.

The present invention is also directed to a photosensing system. Referring to FIG. 6, the photosensing system comprises the photosensing circuit 30, an interface circuit 40 and a processing circuit 50. The photosensing circuit 30 receives an amount of light 32 as input, and produces the two outputs 34, 36 which can be the two currents $i_B$ and $i_A$ or the two voltages $V_B$ and $V_A$. The interface circuit 40 receives the two outputs 34, 36 from the photosensing circuit 30, amplifies and/or converts the outputs 34, 36 from voltage to current, and produces the high-level outputs 44, 46. The processing circuit 50 receives and processes the outputs 44, 46, and produces the output 54. Examples of the processing of the outputs 44, 46 are: correlated double sampling to compensate for random thermal noise, signal conditioning such as signal amplifying, image processing, analog-to-digital converting, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains, are deemed to lie within the spirit and scope of the invention.

What is claimed is:

1. A photosensing circuit comprising:
  a photodetector;
  a bridge network coupled to the photodetector, the bridge network having four network terminals (A), (B), (C), and (D);
  a first circuit connected between network terminal (C) and network terminal (A), the first circuit including a first current source;
  a second circuit connected between network terminal (C) and network terminal (B), the second circuit including a second current source;
  a third circuit connected between network terminal (A) and network terminal (D), the third circuit including a third current source; and
  a fourth circuit connected between network terminal (B) and network terminal (D), the fourth circuit including a fourth current source, the current sources of the network being selected such that a difference of signals flowing out of the network terminals (B) and (A) is directly proportional to an amount of light impinging on the photodetector connected between network terminals (B) and (A), the difference of said signals eliminating common-mode electrical noise.

2. The photosensing circuit of claim 1 wherein the photodetector comprises a photodiode operating in the photoconductive mode.

3. The photosensing circuit of claim 2 wherein the photodetector further comprises a resistive element connected in series with the photodiode, the resistive element impeding forward-biasing of the photodiode.

4. The photosensing circuit of claim 2 wherein the photodetector further comprises a switch connected in series with the photodiode, the switch forming an electronic shutter.

5. The photosensing circuit of claim 1 wherein the currents flowing in the first, second, third and fourth circuits, respectively, are matched such that a difference of signals flowing out of the network terminals (B) and (A) is directly proportional to the amount of light impinging on the photodetector.

6. The photosensing circuit of claim 5 wherein a voltage developed across the network terminals (B) and (A) is directly proportional to the amount of light impinging on the photodetector.

7. The photosensing circuit of claim 5 wherein the currents flowing through the third and fourth circuits, respectively, are controlled such that a voltage developed across the network terminals (B) and (A) in response to a predetermined amount of light impinging on the photodetector is at a predetermined level.

8. The photosensing circuit of claim 5 wherein the currents flowing through the first, second, third and fourth circuits are matched utilizing the current sources such that the difference of the currents flowing out of the network terminals (B) and (A), respectively, is equal to twice the current flowing through the photodetector.

9. A photosensing circuit comprising:
  a photodetector;
  a bridge network coupled to the photodetector, the bridge network having first and second output terminals, two network terminals (C) and (D), and two nodes (A) and (B);
  a first circuit connected between network terminal (C) and node (A), the first circuit including a first current source;
  a second circuit connected between network terminal (C) and node (B), the second circuit including a second current source;
  a third circuit connected between node (A) and network terminal (D), the third circuit including third and fifth current sources; and
  a fourth circuit connected between node (B) and network terminal (D), the fourth circuit including fourth and sixth current sources, the third and fourth current sources being controlled by the first and second current sources, respectively, the fifth and sixth current sources being connected to the third and fourth current sources, respectively, in a current mirror configuration to provide, at the first and second output terminals, output currents corresponding to currents flowing in the third and fourth current sources; and wherein the photodetector is connected between nodes (B) and (A), and wherein the currents flowing in the first and second circuits are matched such that a difference of output currents flowing out of the first and second output terminals is directly proportional to the amount of light impinging on the photodetector.

10. A system comprising:
(a) a photosensing circuit producing first and second outputs, the photosensing circuit comprising;
 a photodetector;
 a bridge network coupled to the photodetector, the bridge network having first and second output terminals, two network terminals (C) and (D), and two nodes (A) and (B);
 a first circuit connected between network terminal (C) and node (A), the first circuit including a first current source;
 a second circuit connected between network terminal (C) and node (B), the second circuit including a second current source;
 a third circuit connected between node (A) and network terminal (D), the third circuit including third current source; and
 a fourth circuit connected between node (B) and network terminal (D), the fourth circuit including a fourth source, the current sources of the network being selected such that a difference of signals flowing out of the first and second output terminals, the first and second outputs, respectively, is directly proportional to an amount of light impinging on the photodetector connected between nodes (B) and (A), the difference of said signals eliminating common-mode electrical noise;
(b) an interface circuit coupled to the photosensing circuit to receive the first and second outputs, the interface circuit producing a third and fourth outputs, the third and fourth outputs being directly proportional to the first and second outputs, respectively; and
(c) a processing circuit coupled to the interface circuit to receive the third and fourth outputs, the processing circuit processing the third and fourth outputs.

11. A method for producing a photodetecting output substantially free of common-mode electrical noise, the method comprising:
(a) forming a network having four network terminals (A), (B), (C), (D) by connecting a first circuit including a first current source between network terminals (A) and (C), a second circuit including a second current source between network terminals (C) and (B), a third circuit including a third current source between network terminals (A) and (D), a fourth circuit including a fourth current source between network terminals (D) and (B), and first and second output terminals;
(b) coupling the photodetector to network terminals (B) and (A);
(c) matching the currents flowing in the first, second, third and fourth circuits, respectively, such that a difference of signals flowing out of network terminals (B) and (A) is directly proportional to the amount of light impinging on the photodetector, said difference of signals eliminating common-mode electrical noise.

12. The method of claim 11 wherein a voltage developed across the network terminals (B) and (A) is directly proportional to the amount of light impinging on the photodetector.

13. The method of claim 11 wherein the photodetector comprises a photodiode operating in a photo-conductive mode.

14. The method of claim 11 where in (c) comprises controlling currents flowing through the third and fourth circuits, respectively, such that a voltage developed across the network terminal s (B) and (A) in response to a predetermined amount of light impinging on the photodetector is at a predetermined level.

15. The method of claim 11 wherein (c) comprises matching the currents flowing through the first, second, third and fourth circuits such that the difference of the currents flowing out of the network terminals (B) and (A), respectively, is equal to twice the current flowing through the photodetector.

16. The method of claim 11 wherein (a) comprises:
 forming a network in which the third circuit further includes a fifth current source the fourth circuit further includes a sixth current source, the third and fourth current sources being controlled by the first and second current sources, respectively, the fifth and sixth current sources being connected to the third and fourth current sources, respectively, in a current mirror configuration to provide at the first and second output terminals output currents corresponding to currents flowing in the third and fourth current sources.

17. The method of claim 11 further comprises:
 converting each of the voltages at network terminals (B) and (A) into a respective output current using a voltage-to-current amplifier circuit; and
 processing the respective output current using a processing circuitry.

* * * * *

UNITED STATES PATENT AND TRADEMARK OFFICE
CERTIFICATE OF CORRECTION

PATENT NO.    : 6,327,389 B1  Page 1 of 1
DATED         : December 4, 2001
INVENTOR(S)   : Thomas It is certified that error appears in the above-identified patent and that said Letters Patent is hereby corrected as shown below:

Column 2,
Line 17, delete "VBA" and insert -- $V_{BA}$ --.

Signed and Sealed this

Seventeenth Day of September, 2002

Attest:

JAMES E. ROGAN
Attesting Officer    Director of the United States Patent and Trademark Office